UNITED STATES PATENT OFFICE.

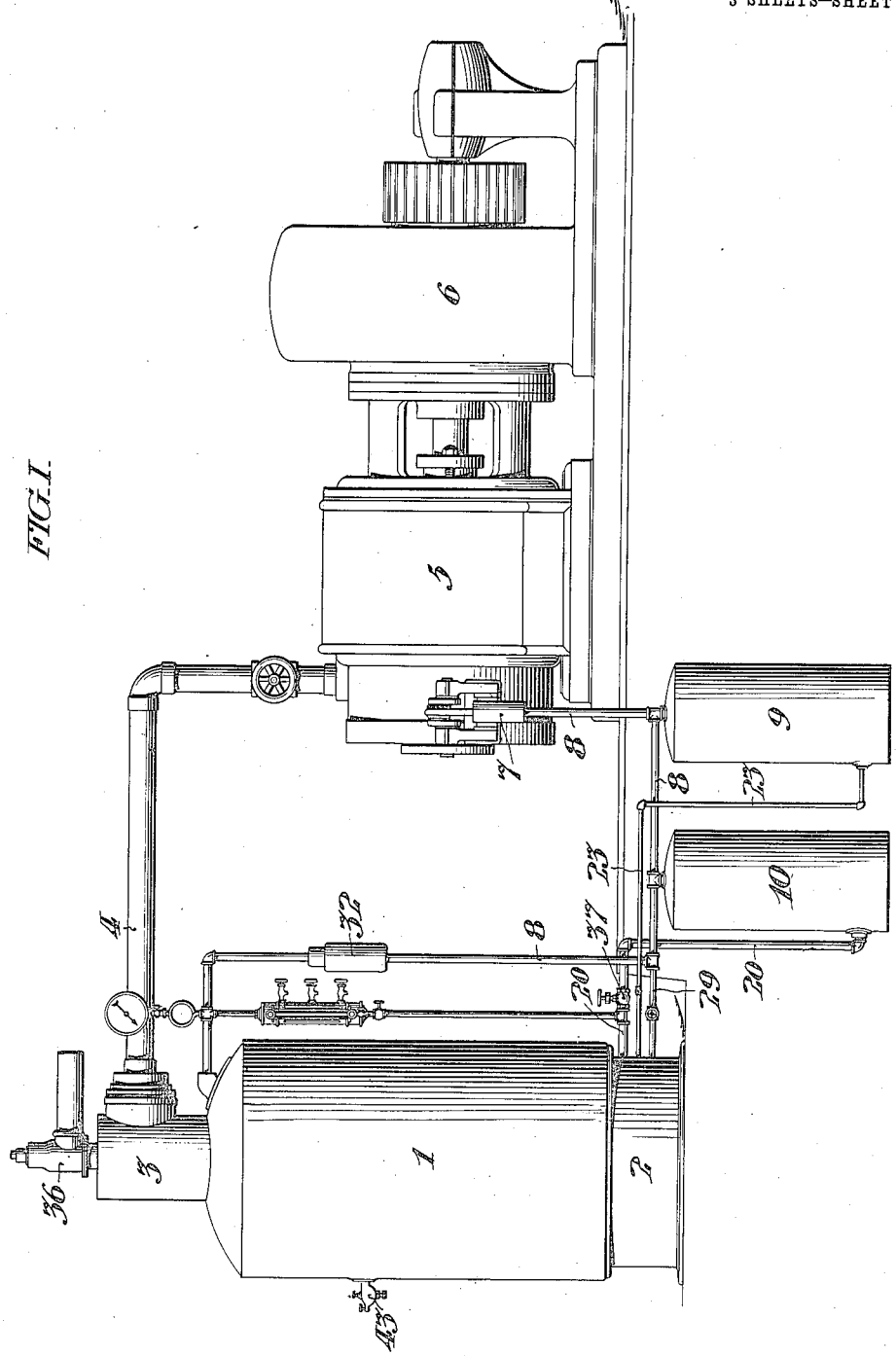

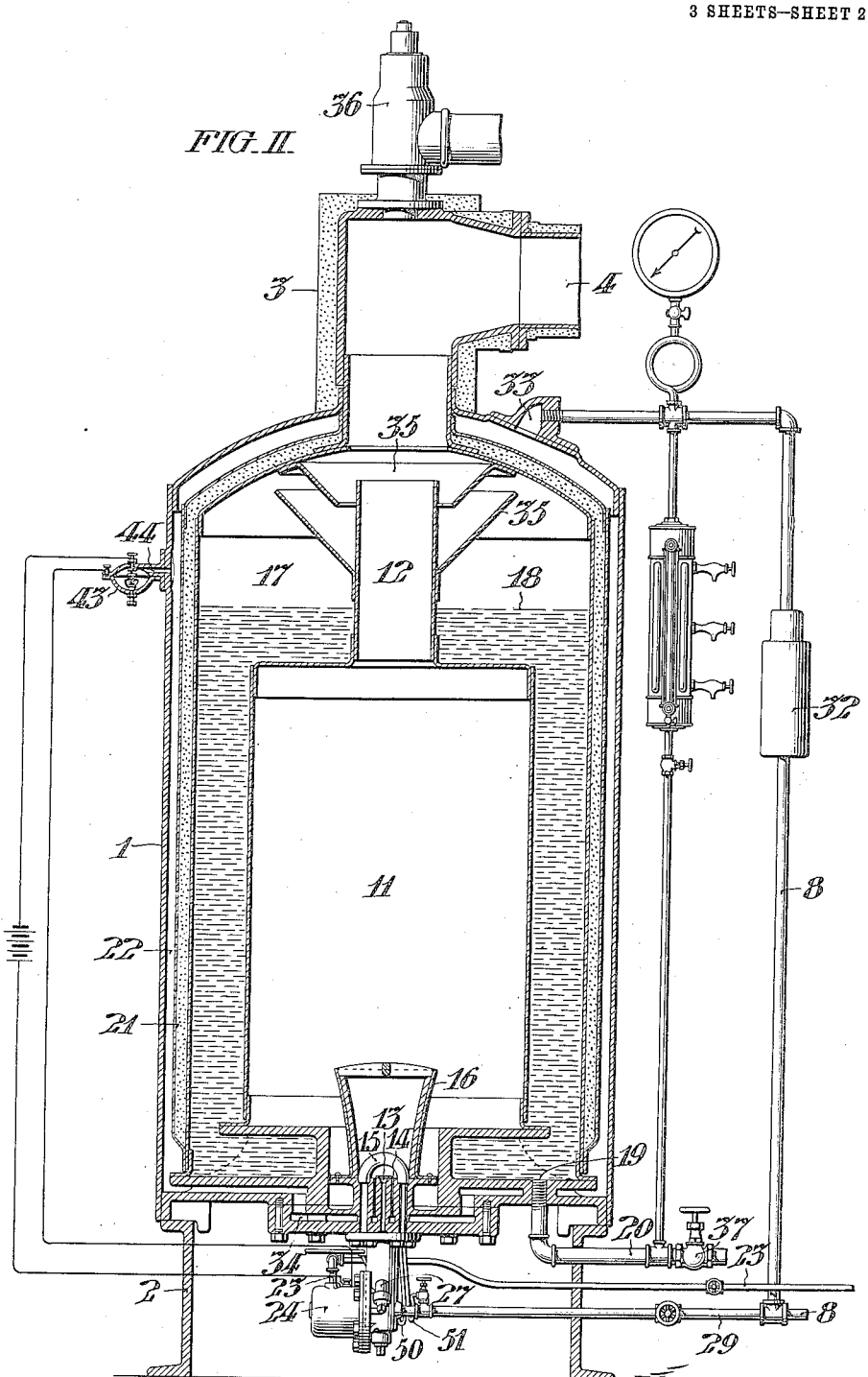

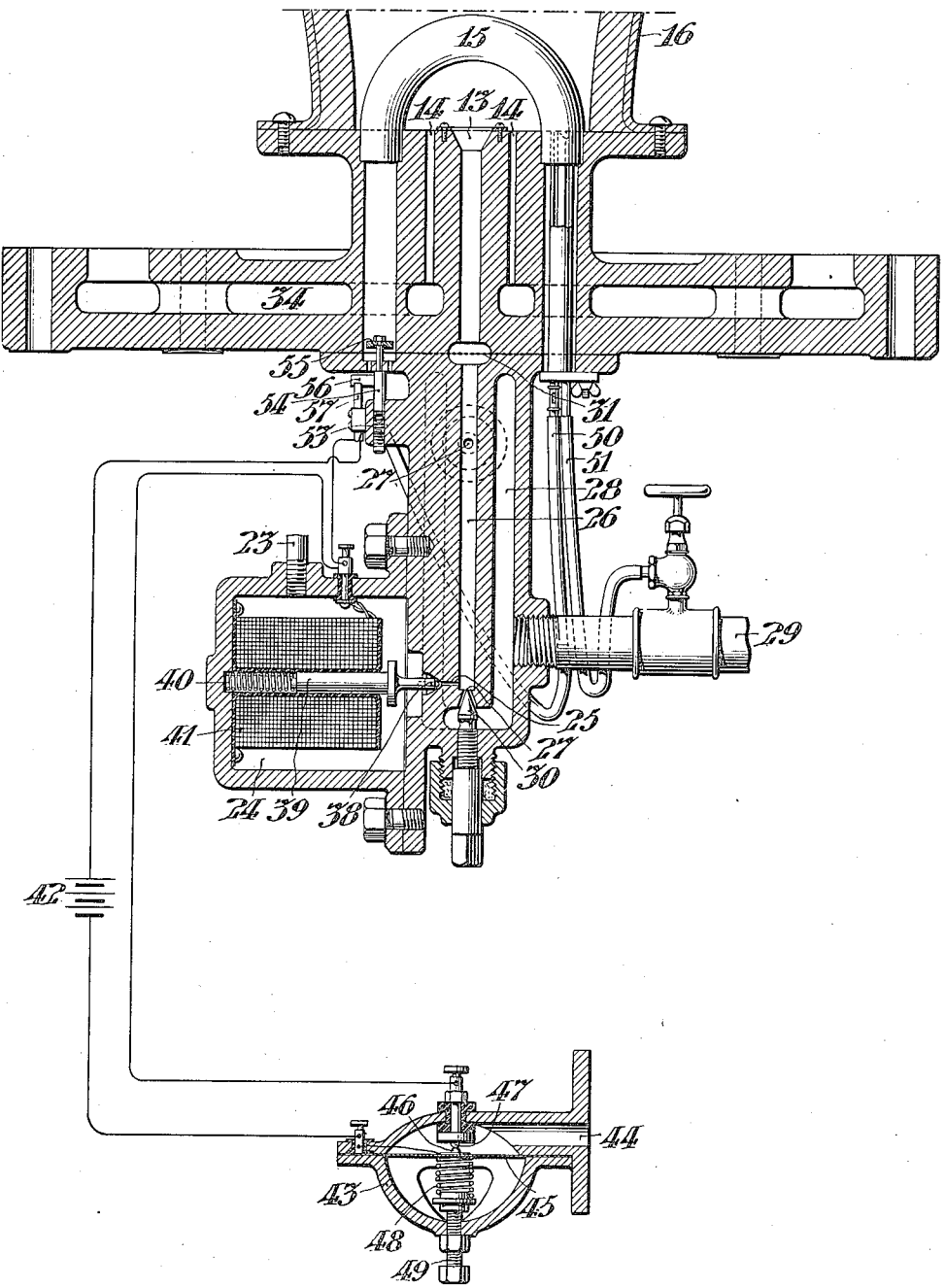

EDWARD C. WARREN, OF PHILADELPHIA, PENNSYLVANIA.

INTERNAL-COMBUSTION PRESSURE-GENERATOR.

981,339.  Specification of Letters Patent. Patented Jan. 10, 1911.

Application filed January 22, 1904. Serial No. 190,148.

*To all whom it may concern:*

Be it known that I, EDWARD C. WARREN, of Philadelphia, in the State of Pennsylvania, have invented certain new and useful Improvements in Internal-Combustion Pressure-Generators, whereof the following is a specification, reference being had to the accompanying drawings.

My invention comprises an internal combustion generator, which produces a continuous controllable gaseous pressure from the combustion and expansion of liquid fuel, and in which I utilize the heat of the gaseous combustion both for the heating of water for the production of steam, the pressure of which is used in combination with that of the gases of combustion, and for the purpose of preheating air which is supplied to the combustion chamber with the fuel. My generator also includes means for atomizing the liquid fuel whereby complete combustion is obtained, and an automatic pressure governor whereby under varying conditions of load a uniform pressure may be maintained without varying the proportions in which the fuel and air are admitted for the purpose of combustion.

Special advantages which I obtain by my invention are the prevention of the loss of energy due to radiation from the combustion chamber of heat which is ordinarily absorbed and wasted in a water jacket; also the prevention of loss by radiation from the outside of the water chamber by means of lagging and an air jacket with utilization of the heat communicating to the air jacket; also the cylinder walls and internal parts of the engine in which the pressure is utilized are preserved from corrosion by the gaseous products of combustion by reason of the steam which is mingled with the gas.

I have shown in the drawings, and will now describe an embodiment of my invention illustrating the principle of construction which I employ, but it will be understood that my invention admits of great variation and adaptation of parts. As illustrated, the generator is utilized for the operation of a rotary engine upon the shaft of which a dynamo is mounted, but my generator may be used with other sorts of engines.

Figure I, is an elevation of the generator showing also the rotary engine, dynamo, supply cylinders and connections. Fig. II, is a central vertical section of the generator. Fig. III, is an enlarged similar section of the parts at the base of the generator showing in greater detail the atomizing and regulating devices.

1, is the generator which is mounted on a suitable base 2, and surmounted by a pressure dome 3, from which the pressure main 4, leads to a rotary engine 5, upon the shaft of which a dynamo 6 is shown.

7, is an air pump operated by the engine 5, which by means of the piping 8, 8, maintains continuous air pressure in both the fuel supply cylinder 9, and the water supply cylinder 10.

11, is the combustion chamber. It is surmounted by a narrowed extension or tube 12, leading nearly to the top of the generator. Atomized liquid fuel, combined with a sufficient quantity of air, is fed into the combustion chamber through the orifice 13. An additional supply of air enters the combustion chamber through the annular slot 14, immediately surrounding the orifice 13, insuring complete combustion. The combustible element is ignited by an incandescent arched tube 15, heated by an internal gas flame.

16, is a flaring cone surrounding the orifice in the base of the combustion chamber and directing the flow of air from the annular slot 14, so as to create a layer of air between the combustion elements and the consumed gases which occupy the outer portions of the combustion chamber. The cone is lined with fire brick. It projects up into the combustion chamber and thereby protects the parts adjacent to its bottom from too intense heat.

17, is an annular water chamber completely surrounding the combustion chamber. The wall of the water chamber has no offset corresponding to that formed by the narrowed extension of the combustion chamber consequently the water when at its normal level 18, covers the top of the combustion chamber. Considerable space, surrounding the narrowed extension of the combustion chamber, is left above the water level, which serves as an ebullition chamber. The water enters the water chamber through the aperture 19, in its base by way of the water pipe 20, leading from the water reservoir 10.

21, is an annular space with a packing of lagging surrounding the water chamber.

22, is an annular air chamber surrounding the chamber 21, and of which the outer wall is the shell of the generator.

Liquid fuel contained within the supply cylinder 9, is forced through the pipe 23, into a valve chamber 24, whence it passes by the aperture 25, to the vertical passage 26, where it is met at intervals by air jets 27. Of these, the lowermost jet enters at the bottom of the passage 26. The others enter at the sides thereof at varying angles. All of these air jets are supplied with air under pressure from an air chamber 28, which almost surrounds the passage 26, and which receives air by the pipe 29, leading from the air pipe 8. For the regulation of the fineness and force of these air jets an interior adjustable conical valve 30, controls each of the air jets. In addition to the air jets, the passage 26, has interposed within it a wire gauze 31. By reason of the different angles at which the air jets are disposed and with the aid of the wire gauze the stream of liquid fuel flowing through the passage 26, is converted into a finely divided or atomized spray in which condition it issues from the orifice 13, in the base of the combustion chamber.

The piping 8, 8, carrying air under pressure from the pump enters a reducing valve 32, by which a constant pressure less than that in the pipe, is maintained and introduced by the orifice 33, into the upper end of the air chamber 22. Thence it passes down through the air chamber, absorbing heat in its descent, and enters a space 24, provided for it in the base plate of the combustion chamber, from whence it passes through the annular orifice 14, into the combustion chamber.

It will be observed that substantially a complete conservation of the heat of the combustion chamber is thus obtained, the heat which in the ordinary internal combustion engine is lost by radiation into a water jacket being utilized to convert the water in the water chamber 17, into steam. The steam thus produced fills the upper part of the water chamber and after passing around baffle plates 35, 35, mingles with the gaseous products of combustion issuing from the tube 12, at the top of the combustion chamber, so that both pressure-supplying elements unite within the dome 3, from whence the pressure thus produced is led by the pressure main 4, to the place where it is to be utilized. Any gas or heat radiated from the water chamber 17, through the lagging 21, passes to the air in the air chamber by which it is returned to the combustion chamber. Upon the dome 3, is mounted a safety valve 36.

The water in the water chamber should be maintained at a level somewhat above the offset of the combustion chamber. This is accomplished by regulating the supply of water by the valve 37, inserted in the water supply pipe 20, the height of the water being constantly indicated by a water gage.

The supply of liquid fuel for combustion is regulated in such a way that the atomized fuel is always admitted at the base of the combustion chamber admixed with the proper proportion of air, while at the same time by intermittently shutting off altogether the supply of fuel, the pressure within the generator is kept under constant and automatic regulation. For this purpose there is provided an electrical regulating device which I will now describe. The valve chamber 24, (which is seen in detail in Fig. III), contains a valve 38, which controls the orifice 25, by means of which the oil enters the passage 26. The stem of this valve carries an armature 39. At its base is a coiled spring 40, constantly tending to close the valve, and surrounding the valve stem is a wire coil 41, acting as an electro-magnet which when energized attracts the armature 39, and opens the valve to its full extent against pressure of the spring 40. The electric circuits within which the coil 41, is interposed is diagrammatically indicated in Fig. III. It includes a battery 42, or other source of electric current, and the pressure regulator 43, which as shown in Fig. II, may be preferably mounted upon the side of the generator and near the top thereof. It is in communication by a passage 44, with the air chamber 22, the pressure in which is constantly dependent upon the internal pressure of the generator. Within the pressure regulator is mounted the flexible diaphragm 45, having a contact point 46, upon its upper surface which is opposed by a contact point 47, adjustably set in the upper side of the pressure regulator. The lower side of the diaphragm is constantly pressed upward by the spring 48, the pressure of which may be delicately adjusted by the screw 49. When the pressure in the air chamber becomes excessive it presses the diaphragm 45, against the tension of the spring 48, and separates the contact points 46, and 47, breaking the circuit. This immediately causes the valve 38, to close the opening 25, and entirely shut off the supply of oil to the combustion chamber. The valve remains closed until the decreasing pressure in the combustion chamber allows the diaphragm in the pressure regulator to rise again whereupon, the circuit is again closed and the valve 38, completely opened, thus maintaining a supply of the combustible element which always bears a fixed proportion to the air supply, except when for purposes of regulation the combustible element is wholly shut off.

The incandescent tube 15, is heated internally by a gas flame which is supplied with gas by pipe 50, and with air under pressure by the pipe 51. The pipe 50, has interposed in it a valve chamber 53, containing a spring pressed valve 54, which is normally held open. The top of the stem of this valve carries a plate 55, which rests near the bottom of one of the chambers in the base plate of the generator with which the porcelain tube is connected, and by way of which the products of the combustion of the gas flame within the tube are led away. In case of the accidental breaking of the tube the external pressure of the generator meeting the plate 55, will force it down, closing valve 54, and wholly shutting off the supply of gas to the tube. At the same time the downward motion of the valve 54, depresses an insulating arm 56, which separates two contact points 57, 57, interposed within the electrical circuit by which the supply of fuel to the generator is regulated, thus instantly breaking the circuit, effecting the closure of the valve 38, and shutting off any further supply of fuel to the generator.

I claim:—

1. In a pressure generator, the combination of a combustion chamber; means for producing both pressure and heat by the ignition of combustible elements therein; a water chamber surrounding the combustion chamber and freely communicating with it at its top, whereby the heat in the combustion chamber converts the water into steam which mingles its pressure with that produced by the ignition of combustible elements in the combustion chamber; an air chamber surrounding the water chamber; a source of compressed air; a conduit connecting said source with said air chamber; pressure regulating means in said conduit between said source and chamber; and means for causing the air which has been heated in the air chamber by heat radiating from the combustion chamber through the water chamber to be fed into the combustion chamber and be there utilized in effecting the combustion of the combustible elements therein supplied.

2. In a pressure generator, the combination of a combustion chamber; an orifice thereto with means for feeding therethrough a supply of atomized liquid fuel; an annular orifice surrounding said first mentioned orifice; means for feeding heated air through said annular orifice; and an arched tube spanning both said orifices, with means for rendering said tube incandescent.

3. In a pressure generator, the combination of a combustion chamber; an orifice thereto with means for feeding therethrough a supply of atomized liquid fuel; an annular orifice surrounding said first mentioned orifice; means for feeding heated air through said annular orifice; an ignition device spanning both said orifices; and an outwardly flaring cone surrounding both said orifices and also the ignition device.

4. In a pressure generator, the combination of a combustion chamber; an orifice and connecting passage for feeding combustible elements thereto; an air chamber surrounding said passage; means for feeding liquid fuel to said passage; and a series of valve-controlled apertures connecting the passage with its surrounding air chamber, through which air jets enter the passage and atomize the liquid fuel supplied therethrough.

5. In a pressure generator, the combination of a combustion chamber; an orifice and connecting passage for feeding combustible elements thereto; an air chamber surrounding said passage; means for feeding liquid fuel to said passage; a series of valve-controlled apertures connecting said passage with its surrounding air chamber, through which air jets enter the passage and atomize the fuel supplied therethrough, with means for adjusting said valves from the exterior of said chamber.

6. In a pressure generator, the combination of a combustion chamber; means for admitting both liquid fuel and air; a spring projected valve controlling the fuel supply which the full projection of the valve shuts off; a coil by the electrical excitation of which the valve is fully opened; an electrical circuit whereby the coil is excited; and means whereby an excess of pressure within the generator breaks said circuit and wholly shuts off the fuel supply.

7. In a pressure generator, the combination of a combustion chamber; means for admitting both liquid fuel and air; a spring projected valve controlling the fuel supply which the full projection of the valve shuts off; a coil by the electrical excitation of which the valve is fully opened; an electrical circuit whereby the coil is excited; an incandescent tube within the combustion chamber whereby the combustible elements therein are ignited; and means whereby the breaking of said tube breaks the electrical circuit thereby wholly shutting off the fuel supply.

8. In a pressure generator, the combination of a combustion chamber; an air chamber surrounding the same and engaging therewith; means for feeding atomized liquid fuel to said combustion chamber; a valve for controlling the supply of liquid fuel under the control of an electric coil; an electrical circuit controlling said coil; and means whereby an excess of pressure in the air chamber affects said electrical circuit and thereby closes the fuel supply valve.

9. In a pressure generator, the combination of a combustion chamber having an orifice through which atomized liquid fuel mingled with air is continuously fed; an annular orifice surrounding the first through which an additional supply of air is continuously fed; an ignition device in proximity to these orifices; and a flaring cone surrounding both orifices and the ignition device, and preventing dispersion of the combustible elements prior to ignition.

10. In a pressure generator, the combination of the combustion chamber having an orifice; a passage way connecting said orifice with a receptacle containing liquid fuel under pressure; and a plurality of air jets interrupting said passage way, whereby the liquid fuel is atomized in the passage and converted into a finely divided spray delivered through the orifice into the combustion chamber.

11. In a pressure generator, the combination of the combustion chamber having an orifice; a passage way connecting said orifice with a receptacle containing liquid fuel under pressure; and, a plurality of air jets meeting said passage way at different angles and interrupting the same, whereby the liquid fuel is atomized in the passage and converted into a finely divided spray delivered through the orifice into the combustion chamber.

12. In a pressure generator, the combination of a combustion chamber; means for continuously maintaining a constant and fixed supply of air thereto; and, means for intermittently supplying a fixed quantity of liquid fuel thereto.

13. In a pressure generator, the combination of a combustion chamber; means for feeding thereto a finely divided spray of atomized liquid fuel and air mingled in fixed proportions; means for regulating the pressure within said combustion chamber, comprising a fuel valve; and, means whereby excess of pressure in the combustion chamber completely closes the valve, and reduction of pressure completely opens it.

14. In a pressure generator, the combination of a combustion chamber; a pipe leading thereto; means for supplying liquid fuel under pressure to the combustion chamber through said pipe; means for simultaneously directing an air jet against the liquid fuel as it passes through the pipe to the combustion chamber, whereby it is atomized; and, a valve, whereby, without varying the quantity of air supplied by the air jet, the supply of liquid fuel is maintained constant except when intermittently wholly shut off, so that the fuel, if supplied at all, is supplied in fixed proportion to the air.

15. In a pressure generator, the combination of a cylindrical combustion chamber; means for producing heat and gaseous pressure therein; an annular water chamber surrounding the same; an annular packing of lagging surrounding the water chamber; an annular air chamber surrounding the lagging, and, means regulating the pressure of air in said air chamber.

16. In a pressure generator, the combination of a combustion chamber; means for feeding liquid fuel mingled with air thereto; a valve controlling the fuel supply; an electrical coil by which said valve is actuated; and means whereby the circuit which includes said coil is made or broken in accordance with the pressure in the generator.

17. In a pressure generator, the combination of a combustion chamber having an orifice for the supply of combustible thereto; a valve controlling the supply of combustible; an electrical coil whereby said valve is controlled; a diaphragm forming one wall of a pressure chamber which is in communication with the fluid under pressure in the interior of the combustion chamber; and, an electrical circuit including the coil which controls the valve, which circuit is affected by the movement of said diaphragm.

18. In a pressure generator, the combination of a combustion chamber having an orifice through which combustible is fed; a valve controlling the said orifice; means whereby excessive pressure within the generator closes the valve; and means whereby the normal pressure within the generator opens the valve.

19. In a pressure generator, the combination of a combustion chamber having an orifice through which combustible is fed to it; a valve controlling said orifice; electrical coils surrounding the stem of this valve and by the passage of a current through one or the other of which the valve is respectively opened or closed; means whereby excess of pressure within the generator energizes the coil to close the valve; and, means whereby the normal pressure within the generator energizes the coil to open the valve.

20. In a pressure generator, the combination of a combustion chamber having an orifice whereby combustible is fed thereto; an electrical igniting device within the generator in proximity to the orifice; a valve controlling said orifice; and, an electric coil whereby the said valve is controlled, the circuit of which includes the igniting device; whereby, upon the breaking of the igniting device the valve is automatically closed and the supply of the fuel shut off.

21. In a pressure generator, a regulating device consisting of a valve controlling an orifice through which combustible is fed thereto; an armature connected with the stem of said valve; two coils acting upon opposite sides of said armature; one of which when energized opens said valve, and the other of which when energized closes said valve; a diaphragm forming a wall of a pressure chamber having a passage whereby fluid under pressure in the generator is admitted to said pressure chamber; contact points fixed to said diaphragm; and, electrical connections; whereby the motion of the diaphragm due to excessive pressure within the generator energizes the coil which closes the valve, while the return of the diaphragm to the position permitted by normal pressure energizes the coil by which motion of the armature is effected to open the valve.

In testimony whereof, I have hereunto signed my name, at Philadelphia, Pennsylvania, this seventh day of January 1904.

EDWARD C. WARREN.

Witnesses:
 JAMES H. BELL,
 E. L. FULLERTON.